United States Patent
Hoffmann et al.

(10) Patent No.: US 7,668,881 B1
(45) Date of Patent: Feb. 23, 2010

(54) SYSTEM AND METHOD FOR ASSOCIATING NIS ATTRIBUTES WITH CIFS CLIENTS

(75) Inventors: John Eric Hoffmann, Pittsburgh, PA (US); Daniel John Drake, Tarentum, PA (US)

(73) Assignee: NetApp, Inc., Sunnyvale, CA (US)

( * ) Notice: Subject to any disclaimer, the term of this patent is extended or adjusted under 35 U.S.C. 154(b) by 519 days.

(21) Appl. No.: 10/858,182

(22) Filed: Jun. 1, 2004

(51) Int. Cl.
*G06F 17/30* (2006.01)
(52) U.S. Cl. .......................... 707/205; 707/10
(58) Field of Classification Search ................ 707/205
See application file for complete search history.

(56) References Cited

U.S. PATENT DOCUMENTS 5,708,812 A * 1/1998 Van Dyke et al. .......... 717/171
6,457,130 B2 * 9/2002 Hitz et al. ..................... 726/27
2002/0116593 A1 * 8/2002 Kazar et al. ................. 711/202
2005/0044399 A1 * 2/2005 Dorey ......................... 713/200
2005/0246401 A1 * 11/2005 Edwards et al. ............. 707/205

OTHER PUBLICATIONS

Sun Microsystems, Inc., Network Working Group Request for Comments 1094 entitled NFS: Network File System Protocol Specification, Mar. 1989, pp. 1-26.

* cited by examiner

*Primary Examiner*—Charles Rones
*Assistant Examiner*—Yuk Ting Choi
(74) *Attorney, Agent, or Firm*—Cesari and McKenna, LLP

(57) ABSTRACT

A system and method for associating NIS attributes with CIFS client. Upon requesting attributes by a CIFS client, a CIFS security ID (SID) is generated for the owner and group from the NIS attributes associated with the NIS name. The generated SIDs are returned to the CIFS client. The SIDs are generated using the NIS UID or GID and a CIFS domain associated with the file server storing the referenced file.

33 Claims, 10 Drawing Sheets

US 7,668,881 B1

SYSTEM AND METHOD FOR ASSOCIATING NIS ATTRIBUTES WITH CIFS CLIENTS

FIELD OF THE INVENTION

The present invention relates to file level attributes and, more particularly to associating NIS attributes with CIFS clients.

BACKGROUND OF THE INVENTION

A storage system is a computer that provides storage service relating to the organization of information on storage devices, such as disks. The storage system may be deployed within a network attached storage (NAS) environment and, as such, may be embodied as a file server. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the SpinFS file system available from Network Appliance, Inc. of Sunnyvale, Calif.

The SpinFS file system is implemented within a storage operating system of a filer having a overall protocol stack and associated disk storage.

Disk storage is typically implemented as one or more storage "volumes" that comprise physical storage disks, defining an overall logical arrangement of storage space.

Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a SpinFS file system, a RAID 4 implementation may be advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

The filer or storage system may be configured to operate with a plurality of file-level protocols, such as the Common Internet File System (CIFS) and the Network File System (NFS) protocols to thereby enhance the utility of the system for networking clients. As such, the storage system is typically configured with a CIFS server and/or an NFS server. The NFS protocol is typically utilized by Unix-based clients to access data sets served by the NFS server, whereas the CIFS protocol is typically associated with Microsoft Windows-based clients serviced by the CIFS server. NFS and CIFS utilize differing authentication techniques for identifying access limitations to particular a data set, such as a file.

Specifically, the NFS protocol utilizes a conventional network information services (NIS) set of attributes. As such, the terms NFS attributes and NIS attributes shall be used interchangeably herein, however it is understood that NIS encompasses more than just NFS. NIS utilizes a user identifier (UID) and a primary group identifier (GID) for authentication. To that end, the UID and GID are sent from the client to the NFS server with every NFS operation containing a data access request. The NFS server compares the received UID and/or GID with permissions associated with a particular file. The NFS server does not perform any additional authentication, but simply accepts the UID/GID that is asserted by the client when sending the data access request. In an exemplary NFS environment, the permissions associated with a file are stored as mode bits, which are divided into three fields, namely the permissions associated with the owner, with the group, and with others. Each of the three fields contains three bits, one for read access, one for write access, and one for execute permission. NFS mode bits for permissions are further described in *Request for Comments* 1094: *Network File System Protocol Specification*, by Bill Nowicki, March 1989, the contents of which are hereby incorporated by reference.

The CIFS protocol does not trust the client to transmit the correct credentials with a data access request. In a CIFS environment, user identifiers are not UIDs as utilized by NFS but comprise security identifiers (SIDs), which are unique on a worldwide basis. One or more identification authorities authenticate a given SID, as described further below. When a CIFS command arrives at the CIFS server, the credential is compared with an access control list (ACL). An ACL consists of zero or more access control entries (ACE). Each ACE consists of a SID, which identifies the person or group to which the ACE applies, and a set of permissions, which can identify access allowance or denial. Thus, an ACE may identify a particular SID and denote that access is not to be granted to the person(s) identified by that SID.

A noted disadvantage arises when a file is generated by a client of the storage system utilizing the NFS protocol and, at some later point in time, a user or client utilizing the CIFS protocol desires to view the ACL and/or other permissions of the file. As the file was generated by a NFS client, no ACL was generated during file creation. What is needed is a technique for associating NIS attributes with CIFS clients.

SUMMARY OF THE INVENTION

The present invention overcomes the disadvantages of the prior art by providing a technique for associating NIS attributes with CIFS clients of a storage system to enable those clients to understand appropriate attributes and file permissions associated with a given file served by the system, such as a file server. Generally, the present invention generates the appropriate SIDs and ACLs as needed to respond to CIFS-based queries to NIS-created files. When a CIFS server, executing in a storage operating system on the file server, is queried for the file attributes of a NIS-generated file, the CIFS server first looks up the owner name in NIS and determines if it can map the NIS name to an appropriate CIFS name. If it cannot map the name to a CIFS name, the CIFS server generates a CIFS SID using its own domain as the domain portion of the SID and the NIS UID as the relative identifier of the SID.

The CIFS server then generates an appropriate SID for the group(s) associated with the file using a similar technique as used relating to the owner. Once the appropriate SIDs have been generated, the CIFS server maps NIS mode bits to an ACL utilizing the generated SIDs to identify the owner and group. The SIDs and ACL are then transmitted to the CIFS client for display. If the client requests the names associated with the SIDs, the CIFS server extracts the name(s) from the SIDs and looks up the appropriate name in NIS before returning that latter name to the client.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
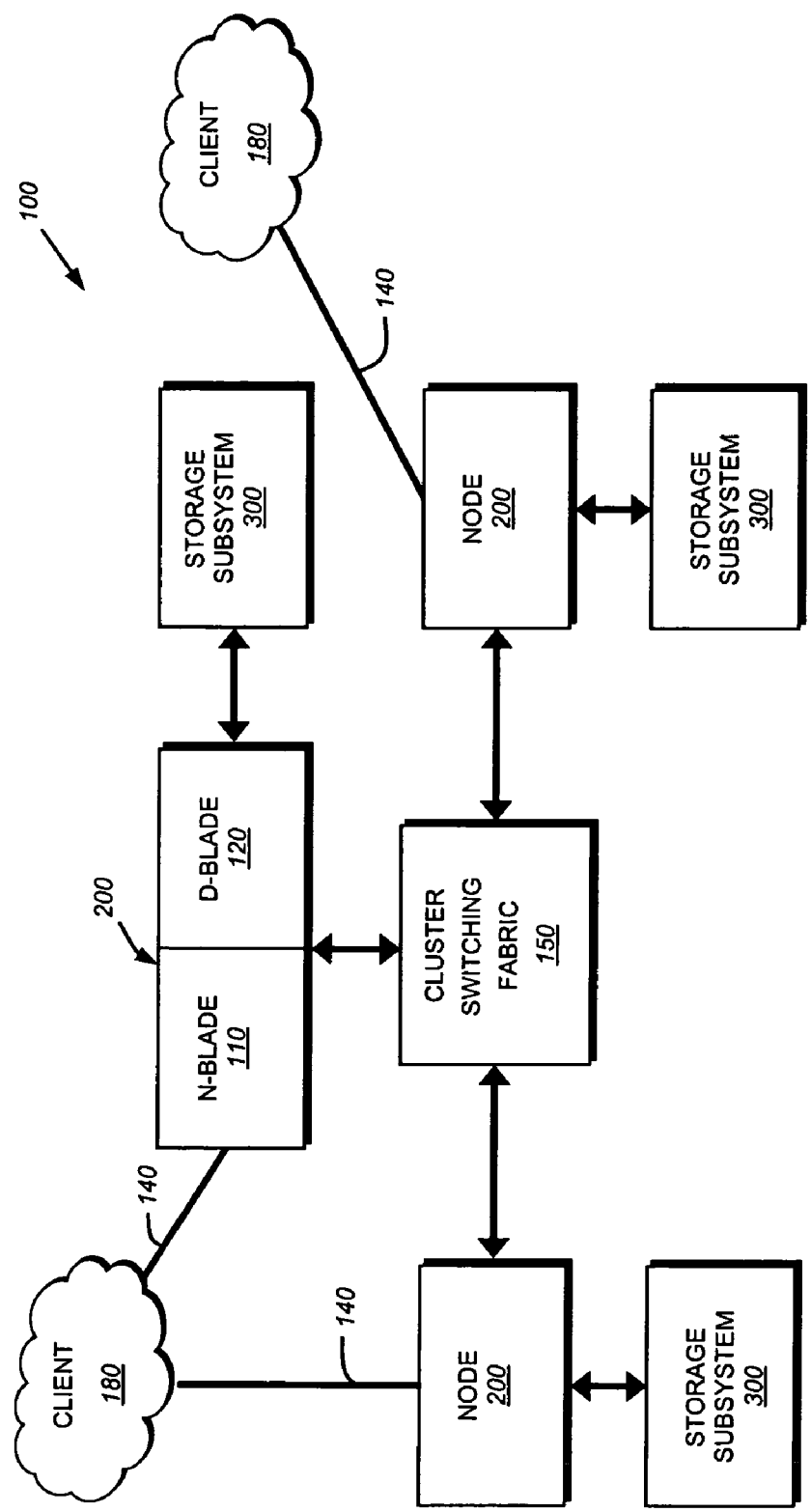
FIG. 1 is a schematic block diagram of a plurality of nodes interconnected as a cluster that may be advantageously used with the present invention.

FIG. 1 is a schematic block diagram of a plurality of nodes 200 interconnected as a cluster 100 and configured to provide storage service relating to the organization of information on storage devices of a storage subsystem. The nodes 200 comprise various functional components that cooperate to provide a distributed Spin File System (SpinFS) architecture of the cluster 100. To that end, each SpinFS node 200 is generally organized as a network element (N-blade 110) and a disk element (D-blade 120). The N-blade 110 includes a plurality of ports that couple the node 200 to clients 180 over a computer network 140, while each D-blade 120 includes a plurality of ports that connect the node to a storage subsystem 300. The nodes 200 are interconnected by a cluster switching fabric 150 which, in the illustrative embodiment, may be embodied as a Gigabit Ethernet switch. The distributed SpinFS architecture is generally described in U.S. Patent Application Publication No. US 2002/0116593 titled Method and System for Responding to File System Requests, by M. Kazar et al. published Aug. 22, 2002.

B. Storage Systems

Figure 2:
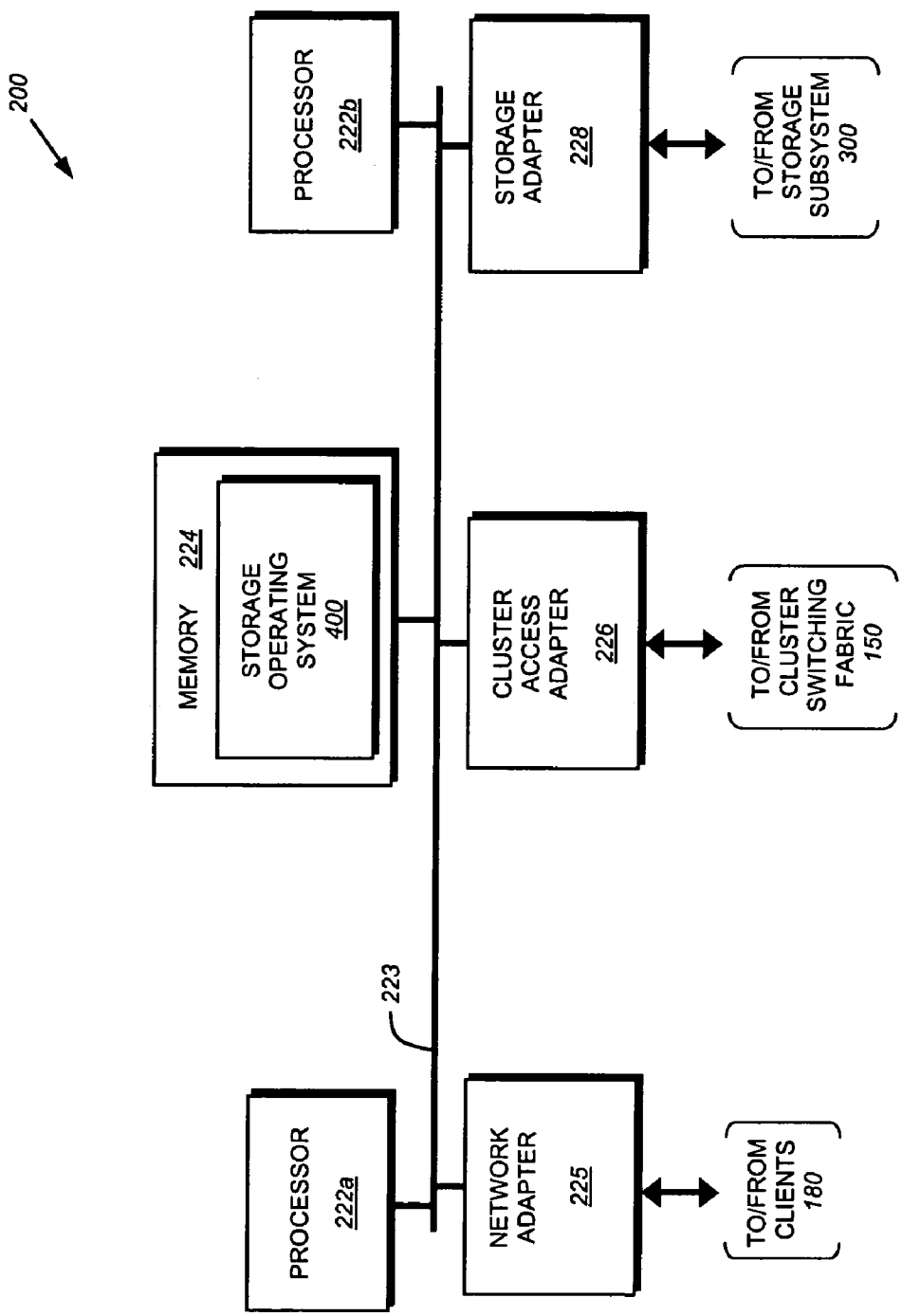
FIG. 2 is a schematic block diagram of a node that may be advantageously used with the present invention.

FIG. 2 is a schematic block diagram of a node 200 that is illustratively embodied as a storage system server comprising a plurality of processors 222, a memory 224, a network adapter 225, a cluster access adapter 226 and a storage adapter 228 interconnected by a system bus 223. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein.

Each node 200 is illustratively embodied as a dual processor server system executing a storage operating system 300 that provides a file system configured to logically organize the information as a hierarchical structure of named directories and files on storage subsystem 300. However, it will be apparent to those of ordinary skill in the art that the node 200 may alternatively comprise a single or more than two-processor system. Illustratively, one processor 222a executes the functions of the N-blade 110 on the node, while the other processor 222b executes the functions of the D-blade 120.

In the illustrative embodiment, the memory 224 comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the inventive system and method described herein.

The network adapter 225 comprises a plurality of ports adapted to couple the node 200 to one or more clients 180 over point-to-point links, wide area networks, virtual private networks implemented over a public network (Internet) or a shared local area network, hereinafter referred to as an Ethernet computer network 140. Therefore, the network adapter 225 may comprise a network interface card (NIC) having the mechanical, electrical and signaling circuitry needed to connect the node to the network. For such a network attached storage (NAS) based network environment, the clients are configured to access information stored on the node 200 as files. The clients 180 communicate with each node over network 140 by exchanging discrete frames or packets of data according to pre-defined protocols, such as the Transmission Control Protocol/Internet Protocol (TCP/IP).

The storage adapter 228 cooperates with the storage operating system 400 executing on the node 200 to access information requested by the clients. The information may be stored on disks or other similar media adapted to store information. The storage adapter comprises a plurality of ports having input/output (I/O) interface circuitry that couples to the disks over an I/O interconnect arrangement, such as a conventional high-performance, Fibre Channel (FC) link topology. The information is retrieved by the storage adapter and, if necessary, processed by processor 222 (or adapter 228 itself) prior to being forwarded over the system bus 223 to the network adapter 225 where the information is formatted into packets or messages and returned to the clients.

Figure 3:
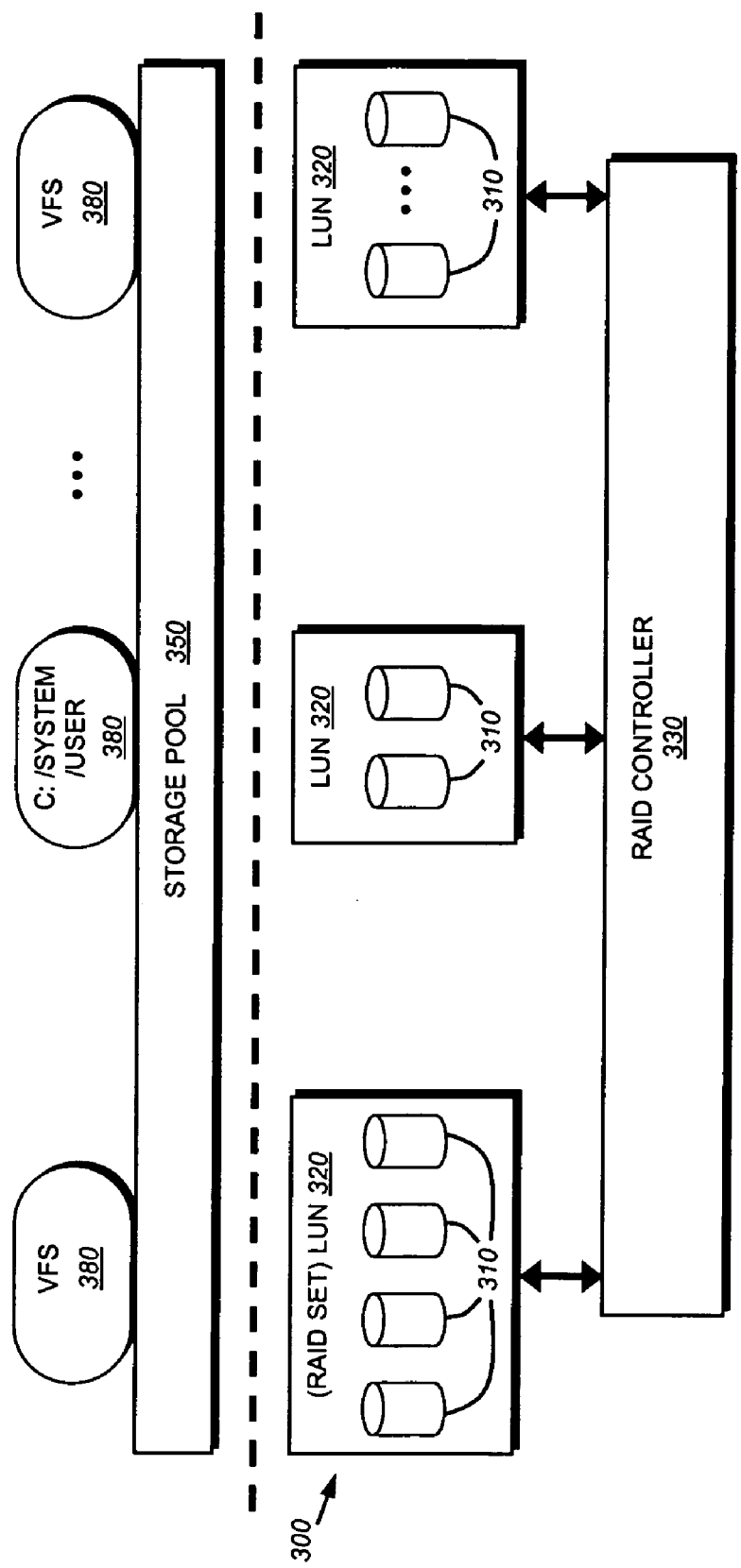
FIG. 3 is a schematic block diagram illustrating the storage subsystem that may be advantageously used with the present invention.

FIG. 3 is a schematic block diagram illustrating the storage subsystem 300 that may be advantageously used with the present invention. Storage of information on the storage subsystem 300 is illustratively implemented as a plurality of storage disks 310 defining an overall logical arrangement of disk space. The disks are further organized as one or more groups or sets of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Each RAID set is illustratively configured by one or more RAID controllers 330. The RAID controller 330 exports a RAID set as a logical unit number (LUN 320) to the D-blade 120, which writes and reads blocks to and from the LUN 320. One or more LUNs are illustratively organized as a storage pool 350, wherein each storage pool 350 is "owned" by a D-blade 120 in the cluster 100. Each storage pool 350 is further organized as a plurality of virtual file systems (VFSs 380), each of which is also owned by the D-blade. Each VFS 380 may be organized within the storage pool according to a hierarchical policy that, among other things, allows the VFS to be dynamically moved among nodes of the cluster, thereby enabling the storage pool 350 to grow and shrink dynamically (on the fly).

In the illustrative embodiment, a VFS 380 is synonymous with a volume and comprises a root directory, as well as a number of subdirectories and files. A group of VFSs may be composed into a larger namespace. For example, a root directory (c:) may be contained within a root VFS ("/"), which is the VFS that begins a translation process from a pathname associated with an incoming data access request to actual data (file) in a file system, such as the SpinFS file system. The root VFS may contain a directory ("system") or a mount point ("user"). A mount point is a SpinFS object used to "vector off" to another VFS and which contains the name of that vectored VFS. The file system may comprise one or more VFSs that are "stitched together" by mount point objects.

C. Storage Operating System

To facilitate access to the disks 310 and information stored thereon, the storage operating system 400 implements a write-anywhere file system, such as the SpinFS file system, which logically organizes the information as a hierarchical structure of named directories and files on the disks. However, it is expressly contemplated that any appropriate storage operating system, including a write in-place file system, may be enhanced for use in accordance with the inventive principles described herein. Each "on-disk" file may be implemented as set of disk blocks configured to store information, such as data, whereas the directory may be implemented as a specially formatted file in which names and links to other files and directories are stored.

As used herein, the term "storage operating system" generally refers to the computer-executable code operable on a computer that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
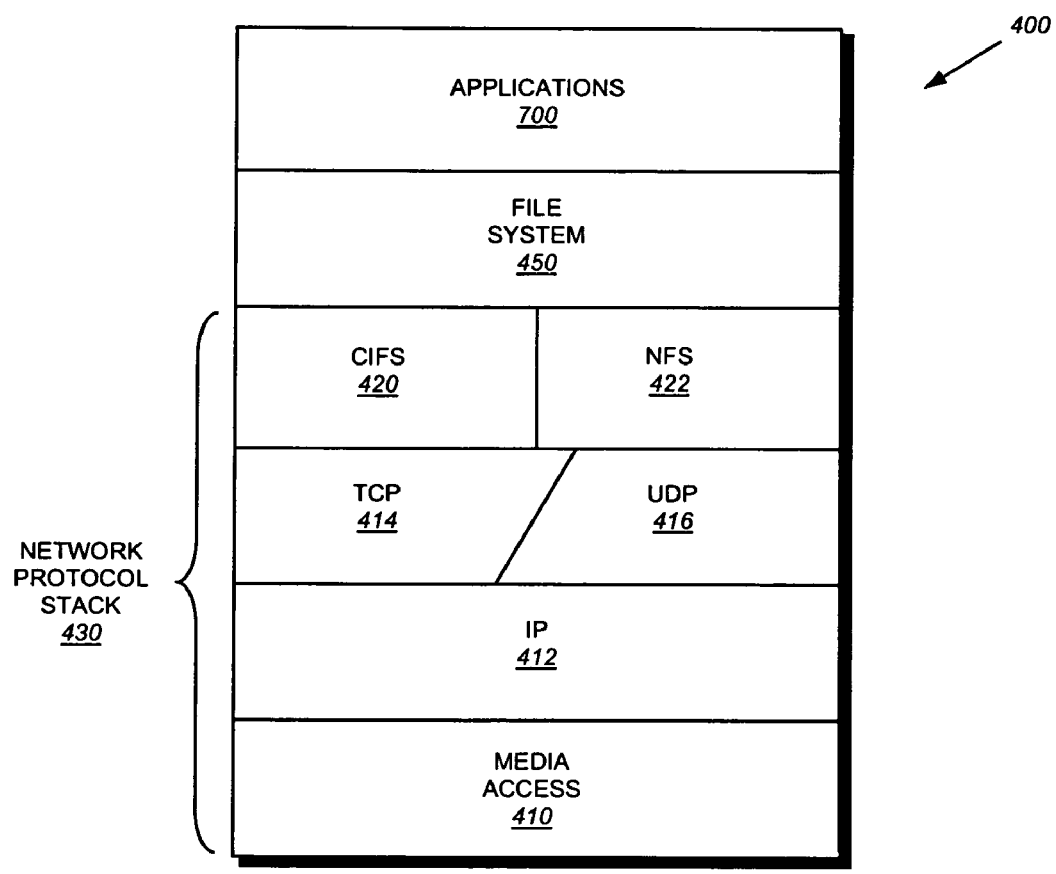
FIG. 4 is a partial schematic block diagram of a storage operating system that may be advantageously used with the present invention.

FIG. 4 is a partial schematic block diagram of the storage operating system 400 that may be advantageously used with the present invention. The storage operating system comprises a series of software layers organized to form an integrated network protocol stack 430 that provides a data path for clients to access information stored on the node 200 using file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access to a file system 450 (the SpinFS file system) and, thus, includes support for the CIFS protocol 220 and the NFS protocol 222. As described further herein, a plurality of management processes executes as user mode applications 700.

In the illustrative embodiment, the processors 222 share various resources of the node 200, including the storage operating system 400. To that end, the N-blade 110 executes the network protocol stack 430 of the operating system 400 to thereby perform protocol termination with respect to a client issuing incoming NFS/CIFS file access request packets over the network 140. The NFS/CIFS layers of the network protocol stack function as NFS/CIFS servers 422, 420 that translate NFS/CIFS requests from a client into SpinFS protocol requests used for communication with the D-blade 120. The SpinFS protocol is a file system protocol that provides operations related to those operations contained within the incoming file access packets. Local communication between an N-blade and D-blade of a node is preferably effected through the use of message passing between the blades, while remote communication between an N-blade and D-blade of different nodes occurs over the cluster switching fabric 150.

Specifically, the NFS and CIFS servers of an N-blade 110 convert incoming (NFS and CIFS) file access requests into SpinFS primitive operations contained within SpinFS packets (requests) that are processed by the D-blades 120 of the cluster 100. Each D-blade 120 provides a disk interface function through execution of the SpinFS file system 450. In the illustrative cluster 100, the file systems 450 cooperate to provide a single SpinFS file system image across all of the D-blades in the cluster. Thus, any network port of an N-blade that receives a client request can access any file within the single file system image located on any D-blade 120 of the cluster.

Figure 5:
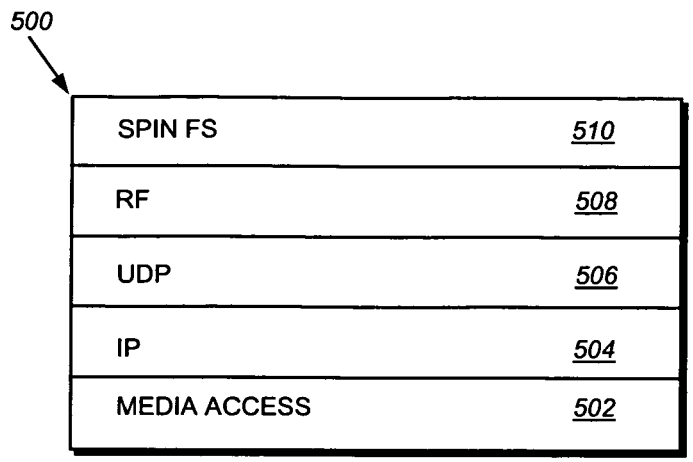
FIG. 5 is a schematic block diagram illustrating the format of a SpinFS request that may be advantageously used with the present invention.

FIG. 5 is a schematic block diagram illustrating the format of a SpinFS request 500 that illustratively includes a media access layer 502, an IP layer 504, a UDP layer 506, an RF layer 508 and a SpinFS protocol layer 510. As noted, the SpinFS protocol 510 is a file system protocol that provides operations, related to those operations contained within incoming file access packets, to access files stored on the cluster 100. Illustratively, the SpinFS protocol 510 is datagram based and, as such, involves transmission of packets or "envelopes" in a reliable manner from a source (e.g., an N-blade) to a destination (e.g., a D-blade). The RF layer 508 implements a reliable transport protocol that is adapted to process such envelopes in accordance with a connectionless protocol, such as UDP 506.

Figure 6:
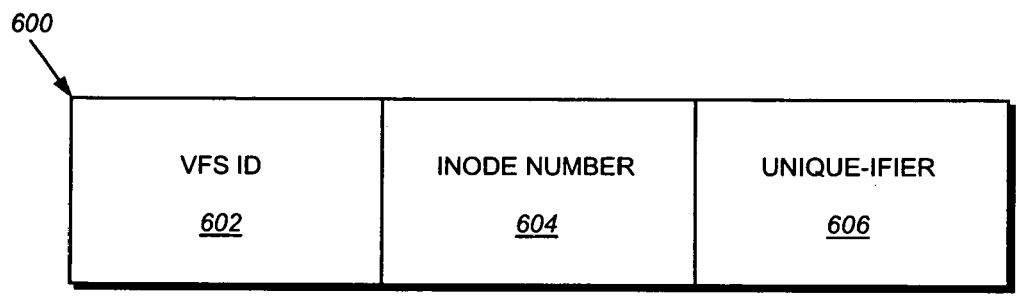
FIG. 6 is a schematic block diagram illustrating the format of a file handle that may be advantageously used with the present invention.

Files are accessed in the SpinFS file system 450 using a file handle. FIG. 6 is a schematic block diagram illustrating the format of a file handle 600 including a VFS ID field 602, an inode number field 604 and a unique-ifier field 606. The VFS ID field 602 contains an identifier of a VFS that is unique (global) within the entire cluster 100. The inode number field 604 contains an inode number of a particular inode within an inode file of a particular VFS. The unique-ifier field 606 contains a monotonically increasing number that uniquely identifies the file handle 600, particularly in the case where an inode number has been deleted, reused and reassigned to a new file. The unique-ifier distinguishes that reused inode number in a particular VFS from a potentially previous use of those fields.

Figure 7:
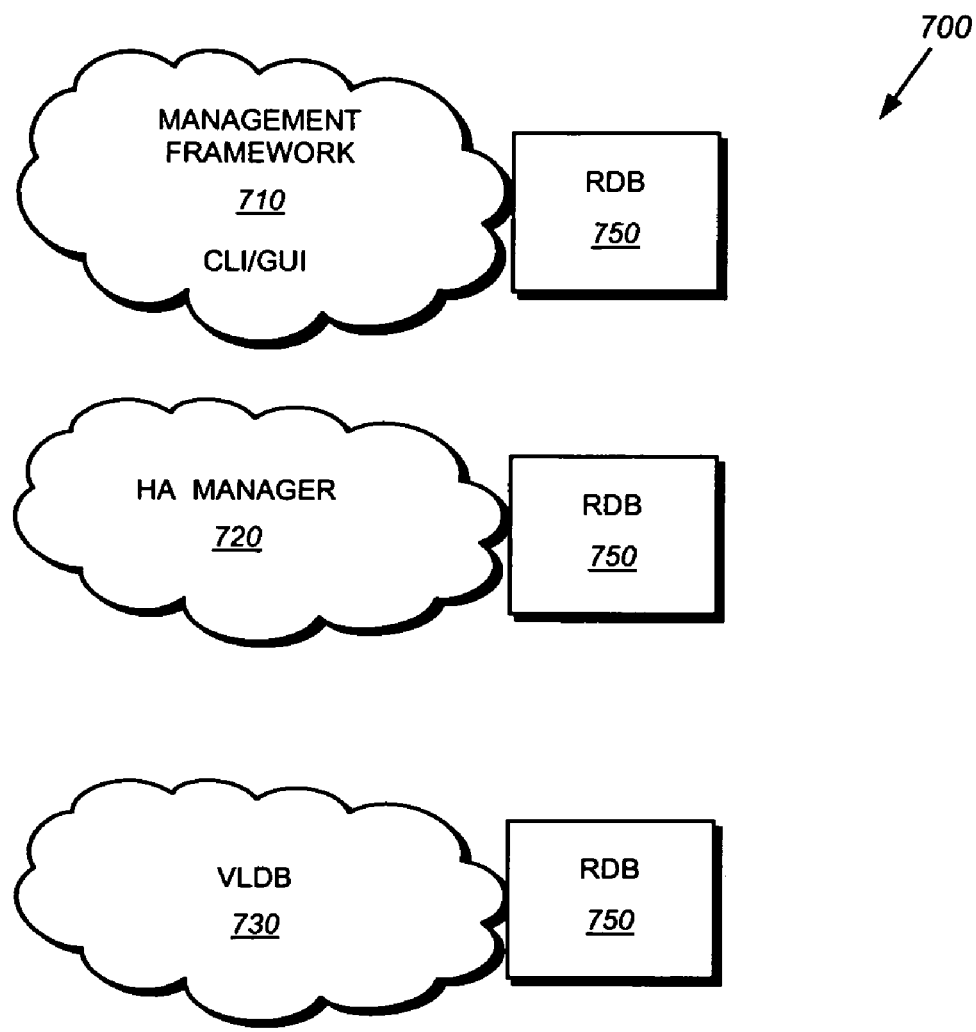
FIG. 7 is a schematic block diagram illustrating a collection of management processes that may be advantageously used with the present invention.

FIG. 7 is a schematic block diagram illustrating a collection of management processes that execute as user mode applications 700 on the storage operating system 400. The management processes include a management framework process 710, a high availability manager (HA Mgr) process 720, a VFS location database (VLDB) process 730 and a replicated database (RDB) process 750. The management framework 710 provides a user interface via a command line interface (CLI) and/or graphical user interface (GUI). The management framework is illustratively based on a conventional common interface model (CIM) object manager that provides the entity to which users/system administrators interact with a node 200 in order to manage the cluster 100.

The HA Mgr 720 manages all network addresses (IP addresses) of all nodes 200 on a cluster-wide basis. For example, assume a network adapter 225 having two IP addresses (IP1 and IP2) on a node fails. The HA Mgr 720 relocates those two IP addresses onto another N-blade of a node within the cluster to thereby enable clients to transparently survive the failure of an adapter (interface) on an N-blade 110. The relocation (repositioning) of IP addresses within the cluster is dependent upon configuration information provided by a system administrator. The HA Mgr 720 is also responsible for functions such as monitoring an uninterrupted power supply (UPS) and notifying the D-blade to write its data to persistent storage when a power supply issue arises within the cluster.

The VLDB 730 is a database process that tracks the locations of various storage components (e.g., a VFS) within the cluster 100 to thereby facilitate routing of requests throughout the cluster. In the illustrative embodiment, the N-blade 110 of each node has a look up table that maps the VS ID 602 of a file handle 600 to a D-blade 120 that "owns" (is running) the VFS 380 within the cluster. The VLDB provides the contents of the look up table by, among other things, keeping track of the locations of the VFSs 380 within the cluster. The VLDB has a remote procedure call (RPC) interface, e.g., a Sun RPC interface, which allows the N-blade 110 to query the VLDB 730. When encountering a VFS ID 602 that is not stored in its mapping table, the N-blade sends an RPC to the VLDB process. In response, the VLDB 730 returns to the N-blade the appropriate mapping information, including an identifier of the D-blade that owns the VFS. The N-blade caches the information in its look up table and uses the D-blade ID to forward the incoming request to the appropriate VFS 380.

All of these management processes have interfaces to (are closely coupled to) the RDB 750. The RDB comprises a library that provides a persistent object store (storing of objects) pertaining to configuration information and status throughout the cluster. Notably, the RDB 750 is a shared database that is identical (has an identical image) on all nodes 200 of the cluster 100. For example, the HA Mgr 720 uses the RDB library 750 to monitor the status of the IP addresses within the cluster. At system startup, each node 200 records the status/state of its interfaces and IP addresses (those IP addresses it "owns") into the RDB database.

Operationally, requests are issued by clients 180 and received at the network protocol stack 430 of an N-blade 110 within a node 200 of the cluster 100. The request is parsed through the network protocol stack to the appropriate NFS/CIFS server, where the specified VFS 380 (and file), along with the appropriate D-blade 120 that "owns" that VFS, are determined. The appropriate server then translates the incoming request into a SpinFS request 500 that is routed to the D-blade 120. The D-blade receives the SpinFS request and apportions it into a part that is relevant to the requested file, as well as a part that is relevant to specific access (read/write) allocation with respect to blocks on the disk. All functions and interactions between the N-blade 110 and D-blade 120 are coordinated on a cluster-wide basis through the collection of management processes and the RDB library user mode applications 700.

D. Associating NIS Attributes with CIFS Clients

The present invention is directed to a technique for associating NIS attributes with CIFS clients of a storage system server, such as node 200. For example, the present invention permits a CIFS client to view the attributes of a file generated using the NFS protocol. In the illustrative embodiment, the CIFS server 420 of the storage operating system 400 is modified to implement the present invention. However, in alternate embodiments the teachings may be incorporated into other modules of the storage operating system.

Figure 8:
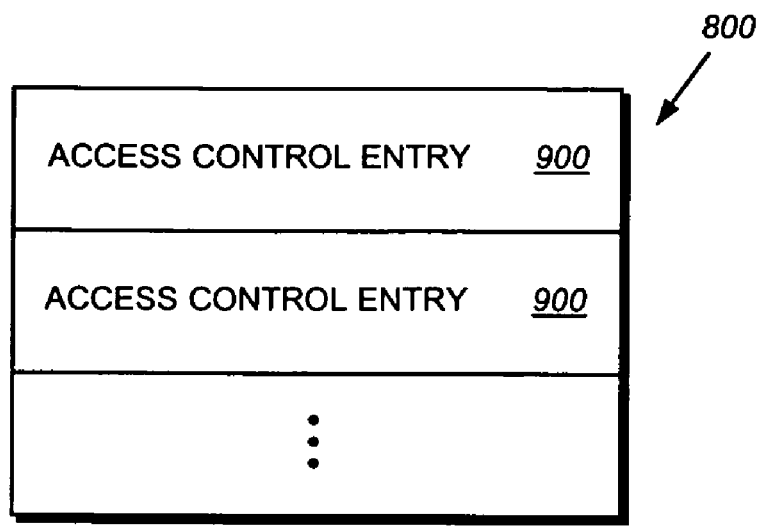
FIG. 8 is a schematic block diagram of an exemplary access control list (ACL) in accordance with an embodiment of the present invention.
Figure 9:
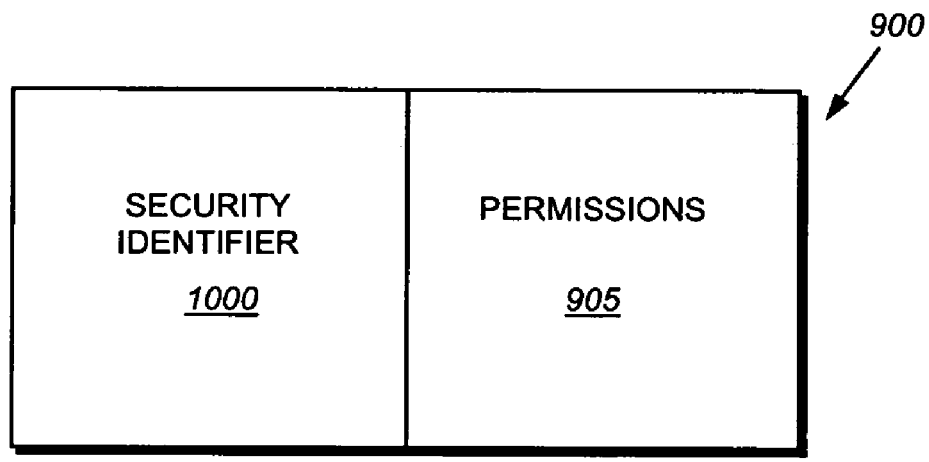
FIG. 9 is a schematic block diagram of an exemplary access control entry (ACE) in accordance with an embodiment of the present invention.

FIG. 8 is a schematic block diagram of an exemplary CIFS access control list (ACL) 800 in accordance with an embodiment of the present invention. The ACL 800 comprises zero or more access control entries 900. An exemplary access control entry (ACE) 900 is shown in FIG. 9. The ACE 900 includes a security identifier (SID) field 1000 and a permissions field 905. The SID field 1000 includes a SID identifying a user or group. The permissions field 905 identifies permissions that are specifically granted or denied to the user or group associated with the SID. An ACE may specify a SID identifying a user and a set of permissions specifically denying the user access. Thus, using an ACL, it is possible to construct an ACL wherein everyone except a certain user may access a given data set.

Figure 10:
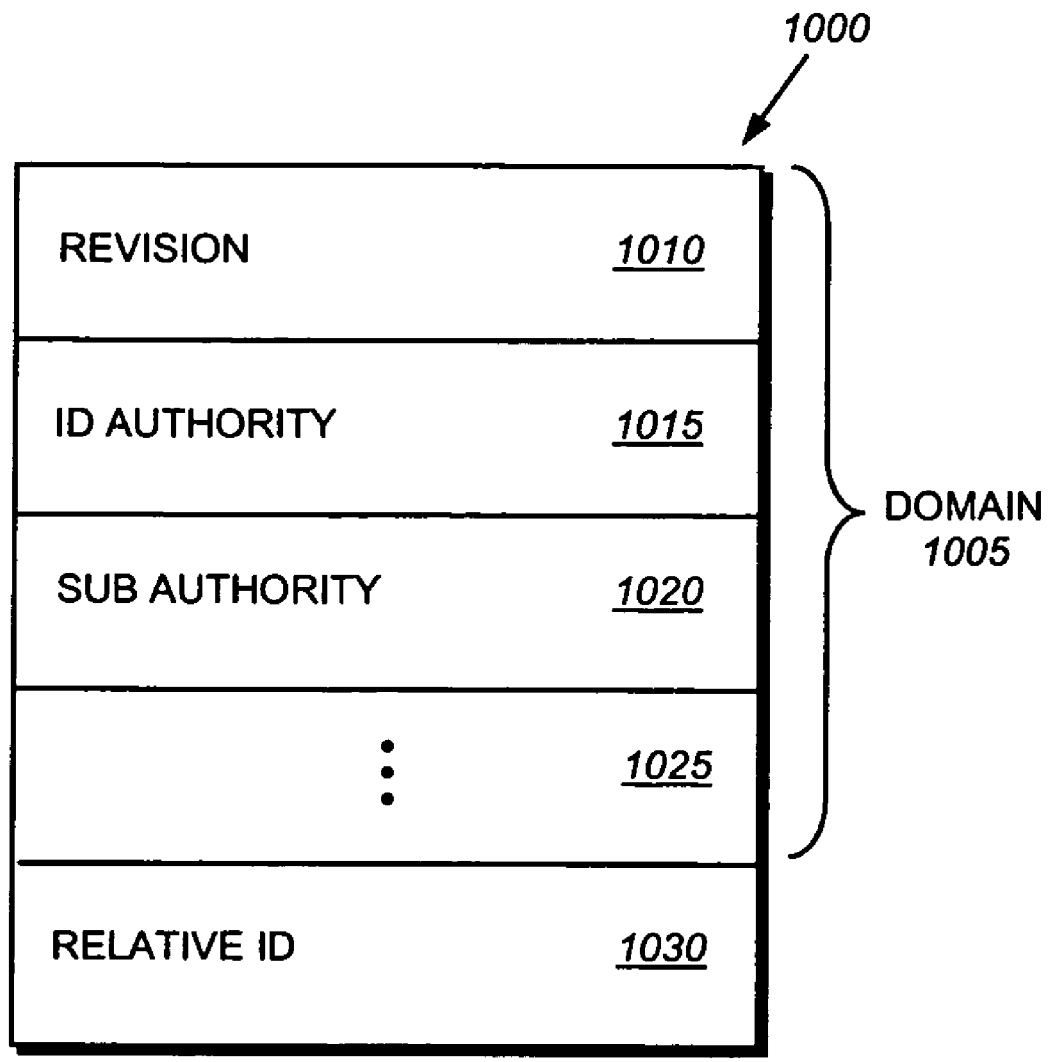
FIG. 10 is a schematic block diagram of an exemplary security identifier (SID) in accordance with an embodiment of the present invention.

FIG. 10 is a schematic block diagram of an exemplary security identifier (SID) 1000 in accordance with an embodiment of the present invention. In a CIFS environment, a SID 1000 uniquely identifies a user or group. The SID 1000 includes a revision field 1010, an ID authority field 1015, one or more sub-authority fields 1020, 1025 and a relative ID field 1030. The revision field 1010 identifies a constant associated with the revision of the CIFS protocol. The ID authority field 1015 what type of authority issued the SID. For example, a value of 5 in the ID authority field 1015 identifies that a Windows NT security authority generated the SID. The sub-authority fields 1020, 1025 collectively identify the issuer of the SID. The revision field 1010, ID authority field 1015 and sub-authority fields 1020, 1025 comprise a domain 1005 of the SID 1000. The relative ID (RID) field 1030 uniquely identifies a particular user within the domain 1005 of the SID 1000. Thus, multiple users of a single CIFS server may have SIDs with identical domains 1005 but differing RIDs 1030. In accordance with the illustrative embodiment, a storage system or file server obtains a domain 1005 to identify itself when it logs into a CIFS domain controller. When it is desired to issue additional SIDs, the file server can append RIDs 1030 to the domain 1005.

As noted above, NIS-based files, such as those created by the NFS protocol, do not include ACLs and/or SIDs in setting permissions, but instead rely on a triplet of mode bits for owner/group/other permissions. The present invention creates the appropriate CIFS SIDs and ACLs "on-the-fly" in response to a CIFS query to a NIS-based file. By generating the appropriate SIDs and ACLs through mapping of the NIS attributes to the CIFS data structures, a CIFS client is able to determine appropriate permissions associated with a file.

Figure 11:
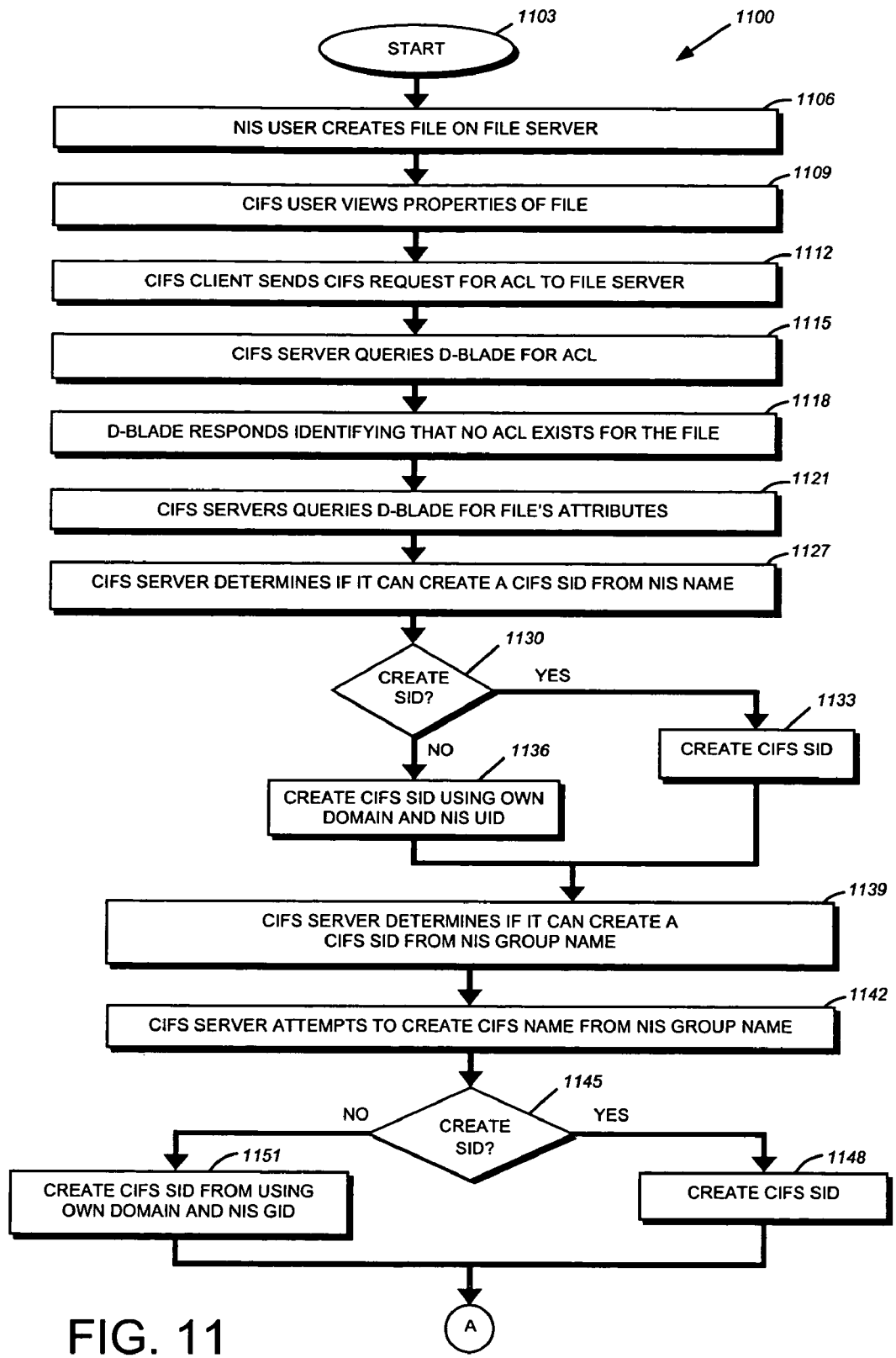
FIG. 11 is a flowchart detailing the steps of a procedure for associating NIS attributes with CIFS clients in accordance with an embodiment of the present invention.
Figure 11:
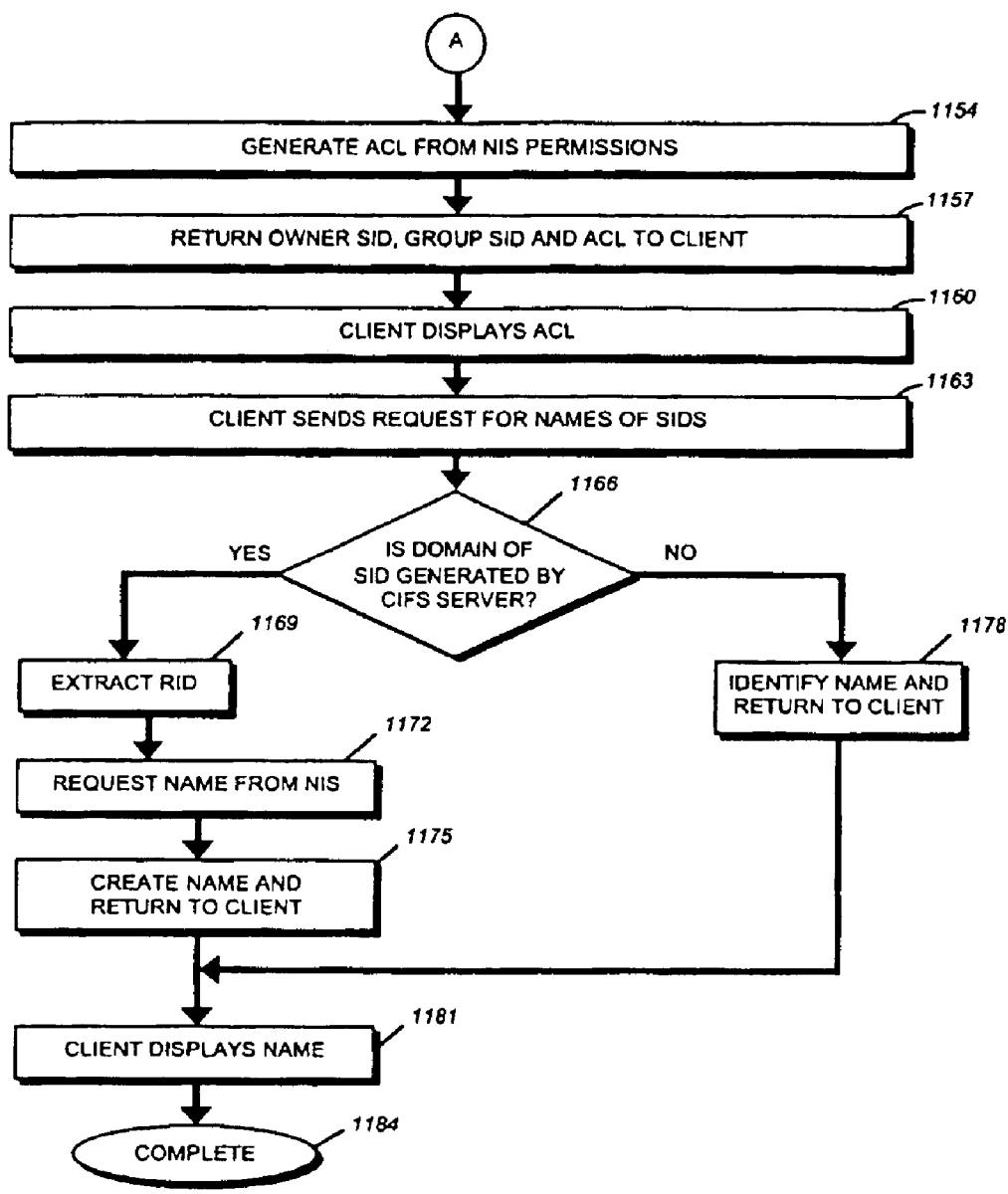

FIG. 11 is a flow chart detailing the steps of a procedure 1100 performed by the CIFS server 420 when implementing an illustrative embodiment of the present invention. The procedure 1100 begins in step 1103 and continues to step 1106 where a NIS user creates a file on a node 200, hereinafter file server. In the illustrative embodiment, the NIS user utilizes the NFS protocol. However, in alternate embodiments, any protocol that utilizes NIS for authentication may be utilized. This file may be created using conventional NFS techniques for file creation.

At some later point in time, a CIFS user desires to view the properties of the NIS-attributed file (step 1109). As noted above, in the illustrative embodiment, CIFS users are typically executing a variant of the Microsoft Windows operating system. In such an operating system, a properties display may be obtained by, e.g., right-clicking on an icon representing a file and selecting a properties menu item. Once in a properties screen, a security tab may be selected to view security attributes associated with the file. However, it should be noted that in alternate embodiments, the security attributes may be viewed in other manners depending on the implementation of the operating system executing on the client. In response to the user selecting the security tab, the CIFS client sends a conventional CIFS request for the ACL associated with the file to the file server (step 1112). The CIFS request is processed by the network stack 430 of the file server and passed to the CIFS server 420 executing in the storage operating system 400. In step 1115, the CIFS server then queries the D-blade 120 for the ACL associated with the file identified in the CIFS request. As a NIS user generated the file, no ACL information exists for the specified file. Thus, the D-blade responds to the CIFS server specifying that no ACL information exists for this file (step 1118). In response, the CIFS server queries the D-blade for the file attributes associated with the file (step 1121). These attributes include the UID and GID associated with the file along with the mode bits associated with the file.

Once the file's attributes are retrieved, the CIFS server determines if it can create a CIFS SID from the NIS name in step 1127. Creation of a CIFS SID from a NIS name typically means that the file server has both a NIS and CIFS credential for the same user, is thereby enabling an efficient mapping from NIS to CIFS. If the CIFS server can create a CIFS SID from a NIS name (step 1130), the procedure branches to step 1133 where the CIFS name is created by, for example, locating the appropriate CIFS SID that is associated with the NIS name.

If the file server cannot map an appropriate CIFS name, the procedure continues to step 1136 where the CIFS server creates a CIFS SID using the domain associated with the file server and the NIS UID. Since it is operating in a CIFS environment, the file server has a unique domain 1005. To create the SID for the NIS user, the CIFS server appends a relative ID (RID) 1030 representing the UID of the user to its domain. As a RID and a UID are typically the same length, e.g., both are 32 bits long, the UID replace the RID to generate a unique CIFS SID representing the NIS user.

Once the CIFS SID has been created, a determination is made as to whether the CIFS server can create a CIFS SID from the NIS group name in step 1139. Note that this determination is similar to that described above in relation to steps 1127-1133. In step 1145 a determination is made as to whether the file server can create the appropriate CIFS SID. If it is possible to create a CIFS SID for the group using an already established CIFS SID, the procedure branches to step 1148 where the CIFS SID is generated from the NIS group name. This may be accomplished by copying a previously established CIFS SID for the group that is associated with the NIS group name. If the creation is not successful, the procedure continues to step 1151 where the CIFS server creates a SID using its own domain. Note that, this step is similar to step 1136, described above. The CIFS server appends to its domain 1005 a RID 1030 representing the NIS GID.

Once the group SID has been created, the procedure, in step 1154, generates an ACL from the NIS permission mode bits. For example, the owner SID is associated with the owner mode bits, the group SID is associated with the group mode bits and the NIS "others" mode bits are associated with the CIFS "everyone" entity. Thus, the CIFS server generates an ACL containing three ACEs, one each for the owner SID, the group SID and the everyone CIFS entity. The CIFS server then returns the owner SID, the group SID and the generated ACL to the client in step 1157.

The client may then display the ACL in the security tab of the attributes display (step 1160). As noted above, the client may display or process the received SIDs and ACL in alternate ways depending on the operating system being executed thereon. The CIFS client then sends a request for the names associated with the SIDs (step 1163) via a conventional CIFS command. In response to this request, the CIFS server determines if the domain of the SID was generated by the CIFS server in step 1166. This determination is made to determine if the CIFS server generated the SID by, e.g., appending a UID/GID to its domain. If so, the procedure continues to step 1169 where the CIFS server extracts the RID from the SID, thereby identify the NIS name associated with the CIFS name. In step 1172, the CIFS server requests a name associated with the extracted RID from NIS. This may be accomplished by conventional NIS lookup operations by requesting the name associated with a particular UID or GID. Once the name has been retrieved from NIS, the CIFS server creates the appropriate NIS name by combining the file server name and the NIS name. Thus, for example, if the file server name is "FILER" and the NIS name is "bob", the combined name would be "FILER/bob." This created name is then returned to the client (step 1175), which displays the name in step 1181. The procedure then completes in step 1184.

However, if in step 1166, the CIFS server determines that it did not generate the SID by appending a RID to its domain, the procedure branches to step 1178 where the CIFS server identifies the appropriate name and returns it to the client. Upon receiving the name, the client displays it in step 1181 before the procedure completes (step 1184).

In alternate embodiments, the CIFS client may not request the names (step 1163) from the CIFS server. Additionally, while this description has been written in terms of mapping NIS attributes to a CIFS server, it should be noted that the principles of the present invention apply to mapping any set of attributes to another set of attributes by generating the appropriate data structures in response to a request. As such, the present invention is not limited to NIS-CIFS mappings, but may be generalized to any pair of file-level protocols that implement differing authentication and/or access control schemas.

To again summarize, the present invention provides a technique for associating is CIFS attributes and ACLs with files generated by a NIS-based file level protocol, such as NFS. After determining that no CIFS attributes exist for a file in which CIFS attributes have been requested, the technique creates the appropriate SIDs and ACLs by mapping the NIS data into CIFS data structures. The generated SIDs and ACL are then returned to the client for display. If the client further requests the names associated with the SIDs, the CIFS server extracts the RID from each SID and obtains the NIS name associated with the UID/GID contained in the RID. The CIFS server then creates an appropriate CIFS name by appending the file server name to the NIS name. This created name is then transmitted to the client for display to a user.

E. Other Embodiments

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems wherein each system performs one or more of the functions. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A computer implemented method for associating first attributes of a first protocol with a file, the file previously generated on a storage system and associated with second attributes of a second protocol, the method comprising:

receiving, over a computer network, a request for the first attributes of the file using the first protocol;

in response to determining that the first attributes of the file do not exist, obtaining the second attributes associated with the file by a server of the first protocol having a server domain name, generating a new name for the first attributes of the first protocol by using the domain name of the server of the first protocol associated with the received request as a domain portion of the new name and a user identifier of the second attributes of the second protocol obtained by the server of the first protocol as a relative identifier of the new name;

generating a new group name for the first attributes of the first protocol by using the domain name of the server of the first protocol associated with the received request as a domain portion of the new group name and a group identifier of the second attributes of the second protocol obtained by the server of the first protocol as a relative identifier of the new group name; and generating a new access control list for the first attributes based on permission bits of the second attributes and the new name and the new group name; and sending, in response to the received request, over a computer network, the new name in the first attributes, the new group name in the first attributes and the new access control list to a requesting client.

2. The computer implemented method of claim 1 wherein the first attributes comprises common Internet file system (CIFS) attributes and wherein the second attributes comprises network information services (NIS) attributes.

3. The computer implemented method of claim 2 wherein the NIS attributes comprise network file system attributes.

4. The computer implemented method of claim 1 wherein the step of generating a new name in the first attributes, further comprises:
creating a security identifier (SID) using a predefined domain and a user identifier associated with the second attributes.

5. The computer implemented method of claim 4 wherein the predefined domain comprises a domain associated with the storage system serving the file.

6. The computer implemented method of claim 1 wherein the user identifier associated with the second attributes comprises a NIS user identifier (UID).

7. The computer implemented method of claim 1 wherein the step of creating a group in the first attributes, further comprises:
creating a security identifier (SID) using a predefined domain and a group identifier associated with the second set of attributes.

8. The computer implemented method of claim 7 wherein the predefined domain comprises a domain associated with the storage system serving the file.

9. The computer implemented method of claim 1 wherein the group identifier associated with the second attributes comprises a NIS group identifier (GID).

10. The computer implemented method of claim 1 wherein the request is a client requesting the first attributes.

11. The computer implemented method of claim 1 wherein the step of generating an access control list in the first attributes, further comprises:
mapping attributes associated with a user identifier (UID) in the second attributes to an access control entry in the first attributes.

12. The computer implemented method of claim 1 wherein the step of generating an access control list in the first attributes, further comprises:
mapping attributes associated with a group identifier (GID) in the second attributes to an access control entry in the first attributes.

13. The computer implemented method of claim 1 wherein the step of generating an access control list in the first attributes, further comprises:
mapping attributes associated with others in the second attributes to an access control entry in the first attributes.

14. The computer implemented method of claim 1 wherein the storage system comprises a file server.

15. A system for associating first attributes of a first protocol with a file, the file previously generated on a storage system and associated with second attributes of a second protocol, the system comprising:
means for receiving, over a computer network, a request for the first attributes of the file using the first protocol;
means for obtaining the second attributes associated with the file by a server of the first protocol having a server domain name in response to determining that the first attributes of the file do not exist,
means for generating a new name for the first attributes of the first protocol by using the domain name of the server of the first protocol associated with the received request as a domain portion of the new name and a user identifier of the second attributes of the second protocol obtained by the server of the first protocol as a relative identifier of the new name;
means for generating a new group name for the first attributes by using the domain name of the server of the first protocol associated with the received request as a domain portion of the new group name and a group identifier of the second attributes of the second protocol obtained by the server of the first protocol as a relative identifier of the new group name; and
means for generating a new access control list for the first set of attributes based on permission bits of the second attributes and the new name and the new group name; and
means for sending, in response to the received request, over a computer network, the new name in the first attributes, the new group name in the first attributes and the new access control list to a requesting client.

16. The system of claim 15 wherein the first attributes comprises common Internet file system (CIFS) attributes and wherein the second attributes comprises network information services (NIS) attributes.

17. The system of claim 16 wherein the NIS attributes comprise network file system attributes.

18. The system of claim 16 wherein the means for generating a new name in the first attributes, further comprises:
means for creating a security identifier (SID) using a predefined domain and a user identifier associated with the second set of attributes.

19. The system of claim 15 wherein the predefined domain comprises a domain associated with the storage system serving the file.

20. The system of claim 15 wherein the user identifier associated with the second attributes comprises a NIS user identifier (UID).

21. The system of claim 15 wherein means for creating a group in the first attributes, further comprises:
means for creating a security identifier (SID) using a predefined domain and a group identifier associated with the second set of attributes.

22. The system of claim 15 wherein the predefined domain comprises a domain associated with the storage system serving the file.

23. The system of claim 15 wherein the group identifier associated with the second attributes comprises a NIS group identifier (GID).

24. The system of claim 15 wherein the means for generating an access control list in the first attributes, further comprises:
means for mapping attributes associated with a user identifier (UID) in the second set of attributes to an access control entry in the first set of attributes.

25. The system of claim 15 wherein the means for generating an access control list in the first attributes, further comprises:
means for mapping attributes associated with a group identifier (GID) in the second attributes to an access control entry in the first attributes.

26. The system of claim 15 wherein the means for generating an access control list in the first attributes, further comprises:
means for mapping attributes associated with others in the second attributes to an access control entry in the first attributes.

27. The system of claim 15 wherein the storage system comprises a file server.

28. A computer readable medium containing executable program instructions executed by a processor, comprising:
program instructions that receive, over a computer network, a request for a first attributes of a file using the first protocol;
program instructions that obtain second attributes associated with the file by a server of the first protocol having a server domain name in response to determining that the first attributes of the file do not exist, program instructions that generate a new name for the first attributes by using the domain name of the server of the first protocol associated with the received request as a domain portion of the new name and a user identifier of the second attributes of the second protocol obtained by the server of the first protocol as a relative identifier of the new name;

program instructions that generate a new group name for the first attributes of the first protocol by using the domain name of the server of the first protocol associated with the received request as a domain portion of the new group name and a group identifier of the second attributes of the second protocol obtained by the server of the first protocol as a relative identifier of the new group name; and program instructions that generate a new access control list for the first attributes based on permission bits of the second attributes and the new name and the new group name; and program instructions that send, in response to the received request, over a computer network, the new name in the first attributes, the new group name in the first attributes and the new access control list to a requesting client.

29. The computer readable medium of claim 28 wherein the first attributes comprises common Internet file system (CIFS) attributes and wherein the second attributes comprises network information services (NIS) attributes.

30. A system for associating first attributes of a first protocol with a file, the file previously generated on a storage system and associated with second attributes of a second protocol, the system comprising:

a network adapter to receive a request for the first attributes of the file using the first protocol;

a file server storing the file and configured to request the first attributes associated with the file, the file server of the first protocol having a server domain name;

a client operatively interconnected with the file server; and a storage operating system executing on the file server, the storage operating system having the server of the first protocol configured to, in response to the first attributes associated with the file not existing:

obtain the second attributes associated with the file;

generate a new name for the first attributes of the first protocol associated with the received request by using the domain name of the server of the first protocol as a domain portion of the new name and a user identifier of the second attributes of the second protocol obtained by the server of the first protocol as a relative identifier of the new name;

generate a new group name for the first attributes of the first protocol associated with the received request by using the domain name of the server of the first protocol as a domain portion of the new group name and a group identifier of the second attributes of the second protocol obtained by the server of the first protocol as a relative identifier of the new group name; and generate a new access control list for the first attributes based on permission bits of the second attributes and the new name and the new group name; and send, in response to the received request, over a computer network, the new name in the first attributes, the new group name in the first attributes and the new access control list to the client.

31. The system of claim 30 wherein the server of the first protocol implements a common Internet file system protocol.

32. The system of claim 30 wherein the first attributes comprises common Internet file system (CIFS) attributes and wherein the second attributes comprises network information services (NIS) attributes.

33. The system of claim 32 wherein the NIS attributes comprise network file system attributes.

* * * * *

UNITED STATES PATENT AND TRADEMARK OFFICE
CERTIFICATE OF CORRECTION

PATENT NO. : 7,668,881 B1 Page 1 of 1
APPLICATION NO. : 10/858182
DATED : February 23, 2010
INVENTOR(S) : Hoffmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this

Seventh Day of December, 2010

David J. Kappos
*Director of the United States Patent and Trademark Office*